United States Patent [19]

Kamei et al.

[11] Patent Number: 4,581,198
[45] Date of Patent: Apr. 8, 1986

[54] DOUBLE-CYLINDER SELECTOR VALVE FOR DETECTING AND LOCATING FAILED NUCLEAR FUEL ASSEMBLIES

[75] Inventors: Mitsuru Kamei; Hiroshi Rindo, both of Mito, Japan

[73] Assignee: Doryokuro Kakunenryo Kaihatsu Jigyodan, Tokyo, Japan

[21] Appl. No.: 539,681

[22] Filed: Oct. 6, 1983

[30] Foreign Application Priority Data

Oct. 18, 1982 [JP] Japan ............................. 57-182656

[51] Int. Cl.[4] .............................................. G21C 17/00
[52] U.S. Cl. .................................... 376/253; 376/245
[58] Field of Search ................................ 376/245, 253

[56] References Cited

U.S. PATENT DOCUMENTS 4,207,922 6/1980 Andrieux et al. ................ 376/245
4,332,639 6/1982 Crosgrove et al. ............... 376/253

OTHER PUBLICATIONS

K. W. Cunningham, G. V. Hough and D. Aliaga-Kelly, "The Detection of Burst Fuel Elements in Nuclear Reactors", pp. 478–485–Genfer, Berichte, 7, 1958.

Primary Examiner—Salvatore Cangialosi
Attorney, Agent, or Firm—Wenderoth, Lind, Ponack

[57] ABSTRACT

A double-cylinder selector valve for detecting and locating failed nuclear fuel assemblies including a fixed outer cylinder provided on the circumferential wall surface thereof with a plurality of outer sampling holes arranged in a grid in both the longitudinal and circumferential directions, and a movable inner cylinder disposed rotatably within the fixed outer cylinder and provided on the circumferential wall surface thereof with a plurality of inner sampling holes. Each of coolant sampling pipes extending from the coolant outlets of each of a plurality of nuclear fuel assemblies is connected to one of the outer sampling holes. The inner sampling holes communicate with some of the plurality of outer sampling holes in the fixed outer cylinder at one position of the movable inner cylinder and with others of the outer sampling holes at other positions of the movable inner cylinder. During one complete rotation of the movable inner cylinder, each of the outer sampling holes can communicate at least once with any of the inner sampling holes.

11 Claims, 12 Drawing Figures

DOUBLE-CYLINDER SELECTOR VALVE FOR DETECTING AND LOCATING FAILED NUCLEAR FUEL ASSEMBLIES

BACKGROUND OF THE INVENTION

This invention relates to a double-cylinder selector valve for detecting and locating fuel assemblies including failed nuclear fuel pins within a nuclear reactor.

When the cladding of nuclear fuel fails, particles of nuclear fuel and fission products are emitted into reactor coolant, contaminate the nuclear power plant, and will eventually cause radioactive pollution and problems for the operator of the reactor and the people in the surrounding environment. It is therefore necessary to rapidly detect the occurrence of any failure in the cladding of fuel and locate which fuel assembly has the failed cladding.

A system using a selector valve shown schematically in FIGS. 1 and 2 is known as a typical conventional apparatus for detecting the location of a failed fuel assembly in a fast breeder reactor. In the selector valve device 1, a thin sampling pipe 2 is disposed at a coolant outlet of each fuel assembly (not shown) so as to separately sample part of the liquid metal coolant flowing out from each fuel assembly. The ends of these sampling pipes 2 are gathered at one position inside the reactor, and are arranged to open circumferentially around the periphery of a sliding plate 3. A rotary pad 6 is slidably provided on the sliding plate 3 and is rotated by a motor 5 via a rotary shaft 4. The rotary pad is connected to a delayed neutron detector 9 by a tube 7 via an electromagnetic pump 8. As the rotary pad 6 rotates slidably around the periphery of the sliding plate 3, a particular sampling pipe 2 opened at the periphery of the sliding plate 3 is selected and part of the liquid metal coolant flowing out from the corresponding coolant outlet of the fuel assembly is sampled. When a fuel failure occurs, fission products are emitted into the coolant. The fission products contain delayed neutron precursors that emit delayed neutrons and disintegrate. These delayed neutrons produced as a result of the decay of the precursors are detected by the delayed neutron detector 9, thereby detecting and determining the location of the failed fuel assembly.

However, in the conventional system described above, the valve portion (sampling switching portion) is arranged in a plane so that as the number of fuel assemblies increases, the installation space needed within the reactor increases, causing problems concerning the load balance of the rotary pad and a complicated structure in the space above the reactor. Moreover, since the system has a construction in which a sliding surface is pushed from above, the whole pad portion must be replaced every few years; and since the construction is complicated, disassembly and repair is difficult when a fault occurs.

SUMMARY OF THE INVENTION

It is therefore an object of the present invention to provide a selector valve which has a novel structure suitable for a reduction in size and does not require a large installation space within the reactor, even if the number of fuel assemblies is great.

It is another object of the present invention to provide a selector valve which is simple in construction and can be easily disassembled and repaired even if a fault occurs.

Briefly stated, the selector valve in accordance with the present invention has a double-cylinder structure consisting of a fixed outer cylinder and a movable inner cylinder disposed rotatably in and coaxially with the outer cylinder. A plurality of outer sampling holes are bored through the circumferential wall surface of the fixed outer cylinder in a grid configuration with a predetermined pitch in both the longitudinal and circumferential directions. Respective coolant sampling pipes extending from respective coolant outlets of a plurality of nuclear fuel assemblies are connected to respective ones of these outer sampling holes. A plurality of inner sampling holes are bored through the circumferential wall surface of the movable inner cylinder. These inner sampling holes communicate with some of the plurality of outer sampling holes in the fixed outer cylinder at one position of the movable inner cylinder and with others of the outer sampling holes in the fixed outer cylinder at other positions of the movable inner cylinder. Thus, when the movable inner cylinder is moved pitch by pitch in the circumferential direction so that it rotates one full revolution, all the outer sampling holes can each communicate at least once with each of the inner sampling holes.

These and other objects of the present invention and its advantages will become more apparent from the following description of the preferred embodiments taken in conjunction with the accompanying drawings.

DESCRIPTION OF THE PREFERRED EMBODIMENTS

The present invention will be described in detail hereinafter with reference to the accompanying drawings.

Figure 1:
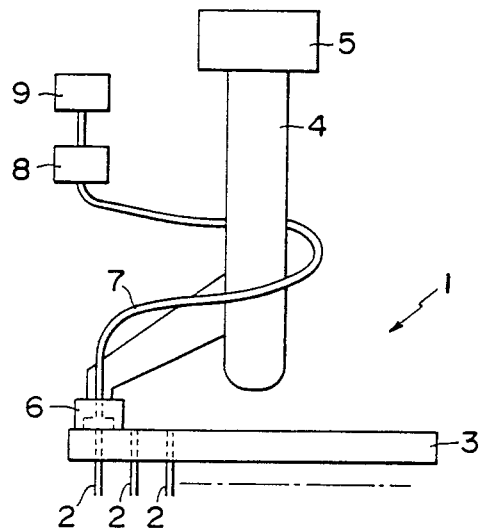
FIG. 1 is a perspective view of the selector valve of a prior art selector valve.
Figure 2:
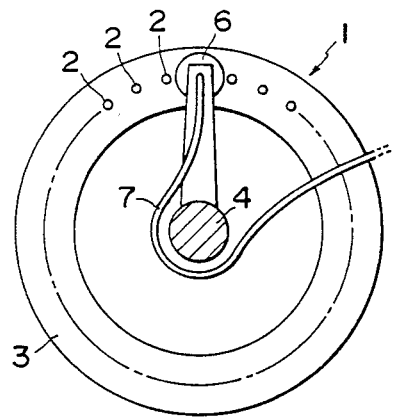
FIG. 2 is a plan view of FIG. 1.
Figure 3:
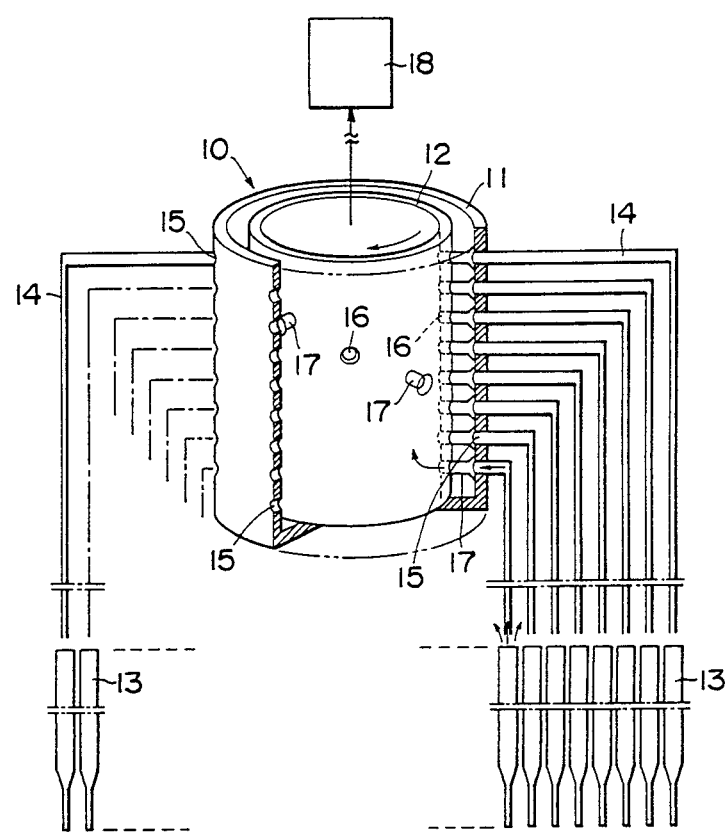
FIG. 3 is a schematic view of a double-cylinder selector valve in accordance with one embodiment of the present invention.

FIG. 3 is a schematic view of an embodiment of the selector valve in accordance with the present invention. As shown in FIG. 3, a selector valve 10 has a double cylindrical structure consisting of a fixed outer cylinder 11 and a movable inner cylinder 12 which is disposed rotatably in and coaxially with the fixed outer cylinder 11. Coolant sampling holes 15, to which coolant sampling pipes 14 extending from coolant outlets of a large number of fuel assemblies 13 are connected, are formed aligned in a grid configuration with a constant pitch in both the longitudinal and circumferential directions in the circumferential wall surface of the fixed outer cylinder 11.

Inner sampling holes 16 are formed aligned along one line in the longitudinal direction and along one line in an oblique direction in the circumferential wall surface of the movable inner cylinder 12. These outer and inner sampling holes 15 and 16 have the same pitch so that each inner sampling hole 16 can accurately meet some of the outer sampling holes 15. In this embodiment, a short hollow tube 17 projects outward from each of the inner sampling holes 16 of the movable inner cylinder 12, so that the inner sampling holes can communicate with some of the outer sampling holes 15 in the fixed outer cylinder 11 that face them, via the short hollow tubes 17. It is of course possible to employ a construction in which the inner sampling holes 16 of the movable inner cylinder 12 each communicate directly with some of the outer sampling holes 15 in the fixed outer cylinder 11 without using short hollow tubes.

Whatever the construction, when the fixed outer cylinder 11 and the movable inner cylinder 12 are combined as shown in FIG. 3, a coolant sample (e.g. liquid sodium) taken from the coolant outlet of each fuel assembly 13 through a coolant sampling pipe 14 is introduced into each of the corresponding outer sampling holes 15. However, only those coolant samples which are selected by the inner sampling holes 16 of the movable inner cylinder 12 enter the movable inner cylinder 12, where the coolant samples are mixed and then introduced into a fission product detector 18. A delayed neutron detector can be used as this detector in the same way as in prior art apparatuses.

As described above, the inner cylinder 12 can rotate, and as it rotates one full turn pitch by pitch, each of the outer sampling holes 15 in the outer fixed cylinder 11 can communicate at least once with any of the inner sampling hole 16 in the movable inner cylinder 12. Accordingly, the position of a failed fuel assembly or assemblies can be identified by rotating the inner cylinder 12 pitch by pitch for 360°.

Figure 4A:
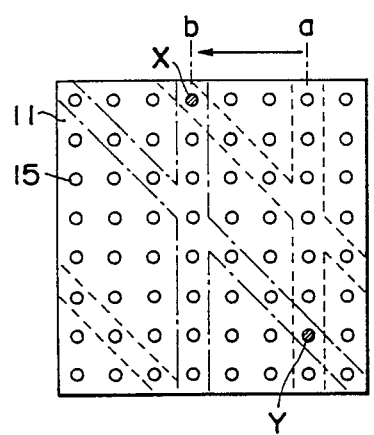
FIG. 4A is an exploded view of an example of a fixed outer cylinder of the double-cylinder selector valve in accordance with the present invention.
Figure 4B:
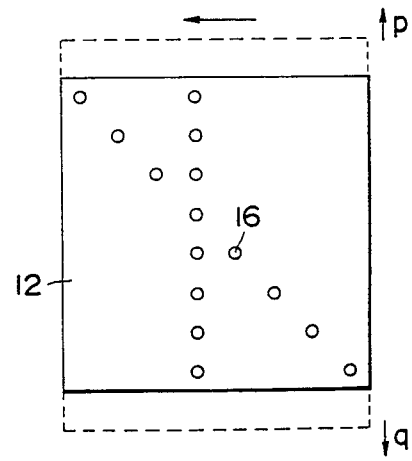
FIG. 4B is an exploded view of an example of a movable inner cylinder used in combination with the fixed outer cylinder of FIG. 4A.

This detection procedure will now be described in further detail with reference to FIGS. 4A and 4B. FIG. 4A is a developed view of the outer cylinder 11, in which sixty four (8×8) outer sampling holes 15 are bored. Each sampling hole 15 communicates with one of the sampling pipes 14 extending from the coolant outlets of each of the fuel assemblies, forming a system which can supervise sixty four nuclear fuel assemblies. FIG. 4B is a developed view of the movable inner cylinder 12 that fits into the outer cylinder 11. Eight inner sampling holes 16 are bored along a line in the longitudinal direction and eight sampling holes 16 are similarly bored along a line in an oblique direction. (Since one of these sampling holes 16 is common to both lines, a total of fifteen sampling holes are provided.) In FIG. 4A, the broked and dot-dash lines indicate the positions of the inner sampling holes in the movable inner cylinder. The nuclear fuel assemblies communicating with sampling holes X and Y can be checked for failure by moving the movable inner cylinder from position a three pitches leftward to position b. If nuclear fission products are detected at positions a and b when the movable inner cylinder is revolved fully once, one of the fuel assemblies communicating with the sampling holes X and/or Y is judged to have failed. In the example shown in FIG. 4A, the sampling holes X and Y are checked simultaneously, but further inspection is extremely easy because only the two fuel assemblies corresponding to X and Y from among the large number of fuel assemblies need be inspected.

In this case, a single fuel assembly can be identified in the following manner. The movable inner cylinder is also able to move in the axial direction (i.e. the vertical direction indicated by arrows p and q in FIG. 4B) so that, when a failure signal is detected by the fission product detector 18, the movable inner cylinder 12 is moved one pitch in the axial direction, and the existence of failure signals is investigated at that position. When, for example, failure signals are detected with the movable inner cylinder at positions a and b in FIG. 4A, as described above, a failure in one or both of the fuel assemblies communicating with sampling holes X and/or Y can be determined. Then, if the movable inner cylinder is moved from position b by one step either upward or downward in the axial direction, and if the failure signal is still detected, the fuel assembly communicating with sampling hole X can be identified as the one that has failed. If no failure signal is detected in this case, the failed fuel assembly is identified as the one communicating with sampling hole Y. In this manner, a failed fuel assembly can be selectively identified by moving the inner cylinder up or down by one step from a position at which the failure signal is detected.

Failures in individual fuel assemblies can also be determined by changing the arrangement of the sampling holes.

Figure 5A:
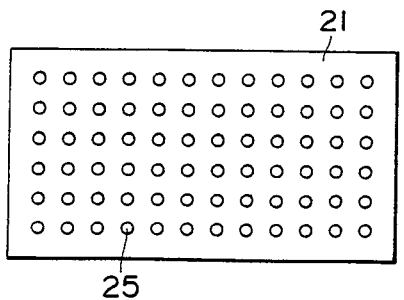
FIG. 5A is a developed view of a fixed outer cylinder in accordance with another embodiment of the present invention.
Figure 5B:
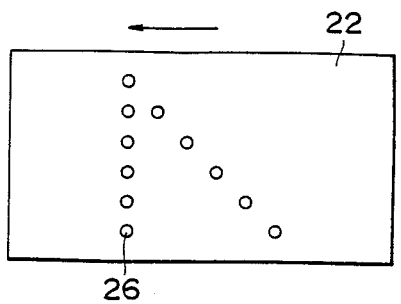
FIG. 5B is an exploded view of an example of a movable inner cylinder used in combination with the fixed outer cylinder of FIG. 5A.

As shown in FIG. 5A, the number of outer sampling holes 15 provided in the longitudinal direction of the fixed outer cylinder 21 is less than half the number of holes in the circumferential direction, and the arrangement of inner sampling holes 26 in the movable inner cylinder 22 that can be combined with the outer sampling holes is changed so that the holes along the line in the oblique direction cross the holes along the line in the longitudinal direction at the uppermost (or lowermost) hole, as shown in FIG. 5B. According to this arrangement, there is no possibility that two failed fuel assemblies, such as X and Y in FIG. 4A, are simultaneously measured, and hence the position of a single failed fuel assembly can be accurately determined.

Figure 6:
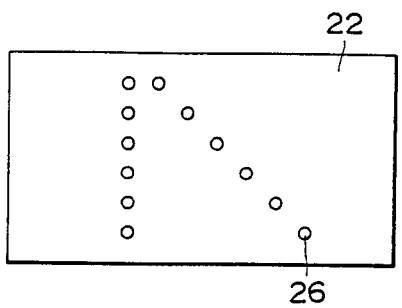
FIGS. 6 through 10 are developed views of movable inner cylinders illustrating different arrangements of the inner sampling holes.

The holes 26 in the movable inner cylinder 22 may be arranged so that the holes along the line in the longitudinal direction do not cross the holes along the line in the oblique direction, as shown in FIG. 6. In such a case, the outer sampling holes provided in the fixed outer cylinder are arranged so that the number of sampling holes in the longitudinal direction is less than half the number of sampling holes in the circumferential direction, in order to remove the possibility of the simultaneous measurement of two outer sampling holes.

Figure 7:
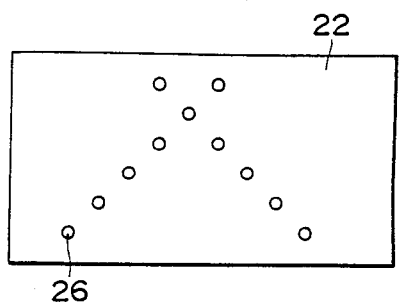
Figure 8:
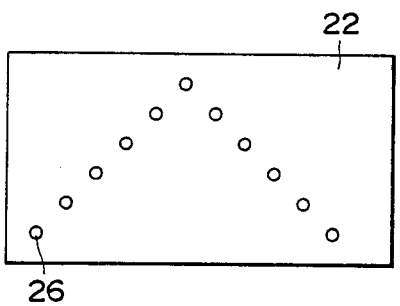
Figure 9:
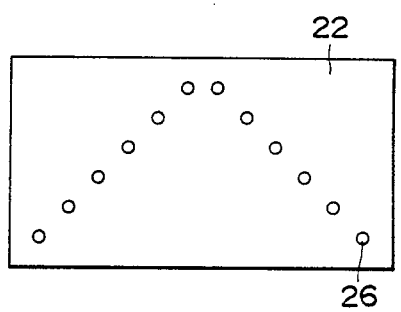
Figure 10:
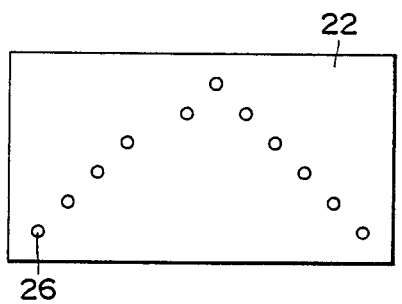

The inner sampling holes 26 bored in the moving inner cylinder 22 need not always be arranged along lines in the longitudinal and oblique directions. For example, the holes may be arranged along a single line in a first oblique direction and along another single line in a second oblique direction which is opposite to and cross the line of the first oblique direction, as shown in FIG. 7. The line of holes in the first oblique direction and that in the second oblique direction may be arranged so as to cross each other at the uppermost (or lowermost) holes, as shown in FIG. 8, or so as not to cross each other, as shown in FIG. 9. Furthermore the arrangement may include a line of holes with a step, as shown in FIG. 10.

Since the present invention provides a double cylindrical selector valve constructed as described above, it is suitable for a reduction in size so that the plane area it occupies is reduced to about 1/5 of a conventional apparatus for the same number of the furel assemblies. The selector valve of the present invention also provides the advantages that its construction is simple, a symmetric design is possible, and disassembly and repair can be carried out easily when a fault occurs. It is to be understood that the foregoing description is of preferred embodiments of the invention and that various changes and modifications may be made in the invention without departing from the scope of the appended claims.

What is claimed is:

1. A double-cylinder selector valve for detecting and locating failed nuclear fuel assemblies, comprising:
   a plurality of coolant sampling pipes;
   a fixed outer cylinder having on the circumferential wall surface thereof a plurality of outer sampling holes arranged in a grid configuration with a predetermined pitch in both the longitudinal and circumferential directions thereof, each of said outer sampling holes having fitted thereto a respective one of said coolant sampling pipes for extending thereto from coolant outlets of each of a plurality of nuclear fuel assemblies; and
   a movable inner cylinder disposed within said fixed outer cylinder so as to be rotatable therein in said circumferential direction, and having on the circumferential surface thereof a plurality of inner sampling holes, said inner sampling holes being arranged in an inner sampling hole configuration so as to communicate with some, less than all, of said plurality of outer sampling holes in said fixed outer cylinder at one angular position of said movable inner cylinder, and with others of said outer sampling holes at another position of said movable inner cylinder;
   said inner sampling holes being arranged in said inner sampling hole configuration such that each of said outer sampling holes communicates at least once with any of said inner sampling holes when said movable inner cylinder is rotated one full turn pitch by pitch in said circumferential direction.

2. The double-cylinder selector valve for detecting and locating failed nuclear fuel assemblies as defined in claim 1 wherein the configuration of said plurality of inner sampling holes bored in the circumferential wall surface of said movable inner cylinder consists of a single line of holes in the longitudinal direction and a single line of holes in an oblique direction.

3. The double-cylinder selector valve for detecting and locating failed nuclear fuel assemblies as defined in claim 2 wherein said single line of inner sampling holes in the longitudinal direction and said single line of inner sampling holes in the oblique direction are arranged so as to cross each other.

4. The double-cylinder selector valve for detecting and locating failed nuclear fuel assemblies as defined in claim 3 wherein said single line of inner sampling holes in the longitudinal direction and said single line of inner sampling holes in the oblique direction are arranged so as to cross each other at one of the uppermost hole and the lowermost hole of said inner sampling holes.

5. The double-cylinder selector valve for detecting and locating failed nuclear fuel assemblies as defined in claim 2 wherein said single line of inner sampling holes in the longitudinal direction and said single line of inner sampling holes in the oblique direction are arranged so as not to cross each other.

6. The double-cylinder selector valve for detecting and loating failed nuclear fuel assemblies as defined in claim 1 wherein the arrangement of said plurality of inner sampling holes bored in the circumferential wall surface of said movable inner cylinder consists of a single line of holes in a first oblique direction and another single line of holes in a second oblique direction which is opposite to the first oblique direction.

7. The double-cylinder selector valve for detecting and locating failed nuclear fuel assemblies as defined in claim 6 wherein said single line of holes in said first oblique direction and said single line of holes in said second oblique direction are arranged so as to cross each other.

8. The double-cylinder selector valve for detecting and locating failed nuclear fuel assemblies as defined in claim 7 wherein said single line of holes in said first oblique direction are arranged so as to cross each other at one of the uppermost hole and the lowermost hole of said inner sampling holes.

9. The double-cylinder selector valve for detecting and locating failed nuclear fuel assemblies as defined in claim 6 wherein said single line of holes in said first oblique direction and said single line of holes in said second oblique direction are arranged so as not to cross each other.

10. The double-cylinder selector valve for detecting and locating failed nuclear fuel assemblies as defined in claim 1 wherein said movable inner cylinder is also movable in the axial direction thereof.

11. The double-cylinder selector valve for detecting and locating failed nuclear fuel assemblies as defined in claim 1 wherein said outer sampling holes in said fixed outer cylinder and said inner sampling holes in said movable inner cylinder corresponding to said outer sampling holes communicate with one another via short hollow tubes.

* * * * *